United States Patent [19]
Batten et al.

[11] Patent Number: 5,770,902
[45] Date of Patent: Jun. 23, 1998

[54] MOTOR TERMINATION BOARD

[75] Inventors: L. Jay Batten, Lebanon; Dennis L. Queary, Jamestown, both of Ohio

[73] Assignee: Globe Motors, Dayton, Ohio

[21] Appl. No.: 552,344

[22] Filed: Nov. 2, 1995

[51] Int. Cl.[6] .................................................. H02K 11/00
[52] U.S. Cl. ...................... 310/71; 310/68 D; 310/68 E; 310/68 R
[58] Field of Search ..................................... 310/71, 68 R, 310/68 D, 68 E

[56] References Cited

U.S. PATENT DOCUMENTS

| | | | |
|---|---|---|---|
| 4,661,733 | 4/1987 | Heyraud | 310/68 R |
| 4,689,023 | 8/1987 | Strong, III et al. | 439/189 |
| 4,724,346 | 2/1988 | Klein et al. | 310/67 R |
| 4,806,808 | 2/1989 | Grecksch et al. | 310/71 |
| 4,845,396 | 7/1989 | Huber | 310/239 |
| 4,916,345 | 4/1990 | Tong | 310/208 |
| 4,926,075 | 5/1990 | Fushiya et al. | 310/50 |
| 4,926,540 | 5/1990 | Kato | 29/596 |
| 4,952,829 | 8/1990 | Ambruster et al. | 310/68 D |
| 4,968,912 | 11/1990 | Shahamat et al. | 310/71 |
| 4,975,607 | 12/1990 | Hara et al. | 310/67 R |
| 4,978,876 | 12/1990 | Koster | 310/239 |
| 4,992,688 | 2/1991 | Cap et al. | 310/71 |
| 5,006,765 | 4/1991 | Schmider | 310/71 |
| 5,280,210 | 1/1994 | Kress et al. | 310/158 |
| 5,309,053 | 5/1994 | Ade | 310/71 |
| 5,509,625 | 4/1996 | Oulette et al. | 244/134 |
| 5,552,654 | 9/1996 | Konno et al. | 310/309 |

*Primary Examiner*—Steven L. Stephan
*Assistant Examiner*—Elvin G. Enad

[57] ABSTRACT

A motor termination board is disclosed for facilitating interconnection of control components and power components in a Brushless DC motor. The motor termination board includes a first stamping having a plurality of conductive paths, where the first stamping includes a plurality of connection points for receiving leads from control components and a plurality of control terminals for connecting the motor termination board to an electronic control of the motor. A second stamping is positioned adjacent the first conductive stamping and also has a plurality of conductive paths, where the second stamping includes a plurality of connection points for receiving leads from windings of the motor and a plurality of power terminals for connecting the motor termination board to a power supply for the motor. A termination board housing is provided for encapsulating the conductive paths of the first and second stampings and includes a first socket around the control terminals and a second socket around the power terminals. The motor termination board further includes a plurality of switching devices connected to the first and second stampings, wherein the switching devices operate to open up the motor windings upon detection of an electrical short therein.

21 Claims, 10 Drawing Sheets

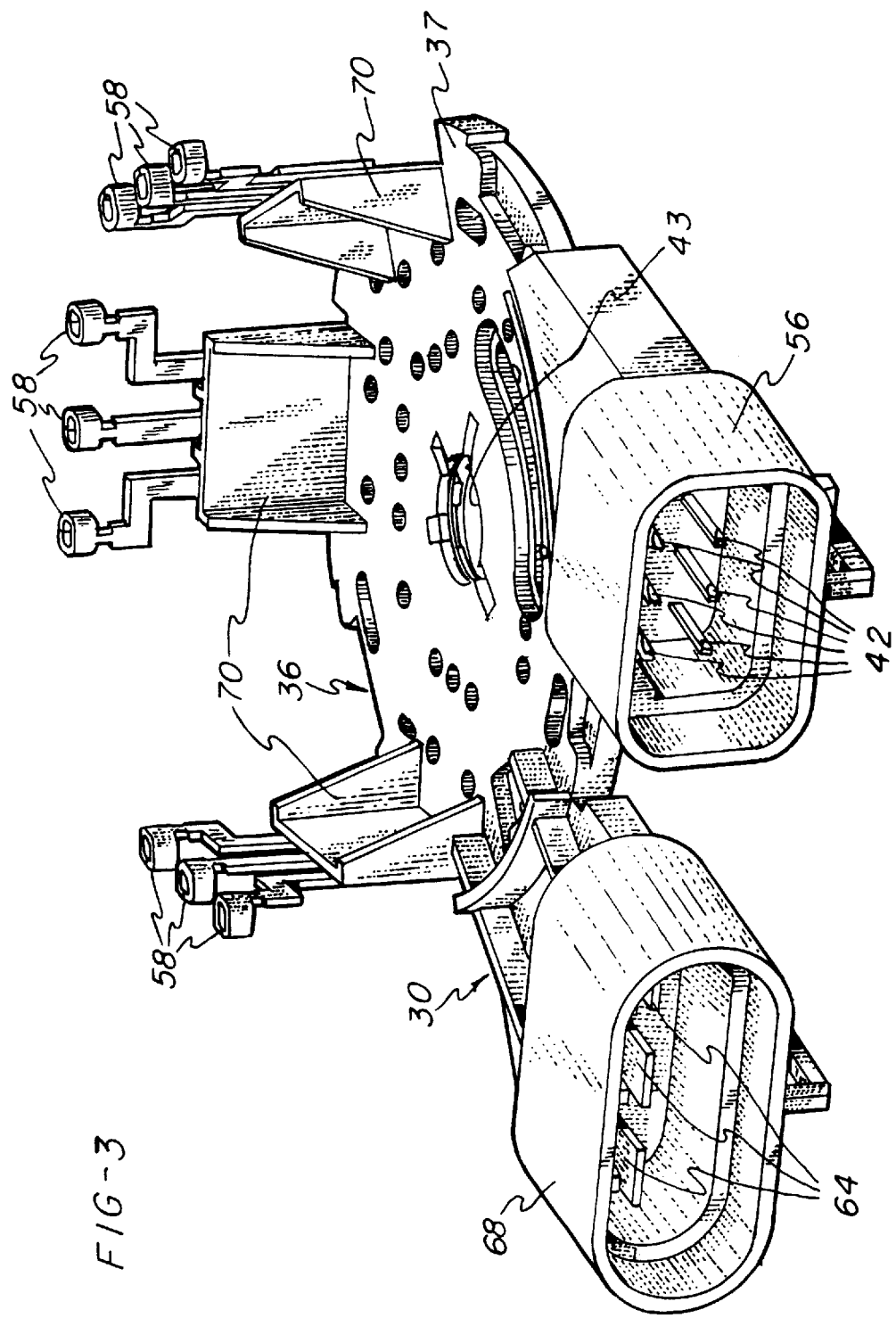

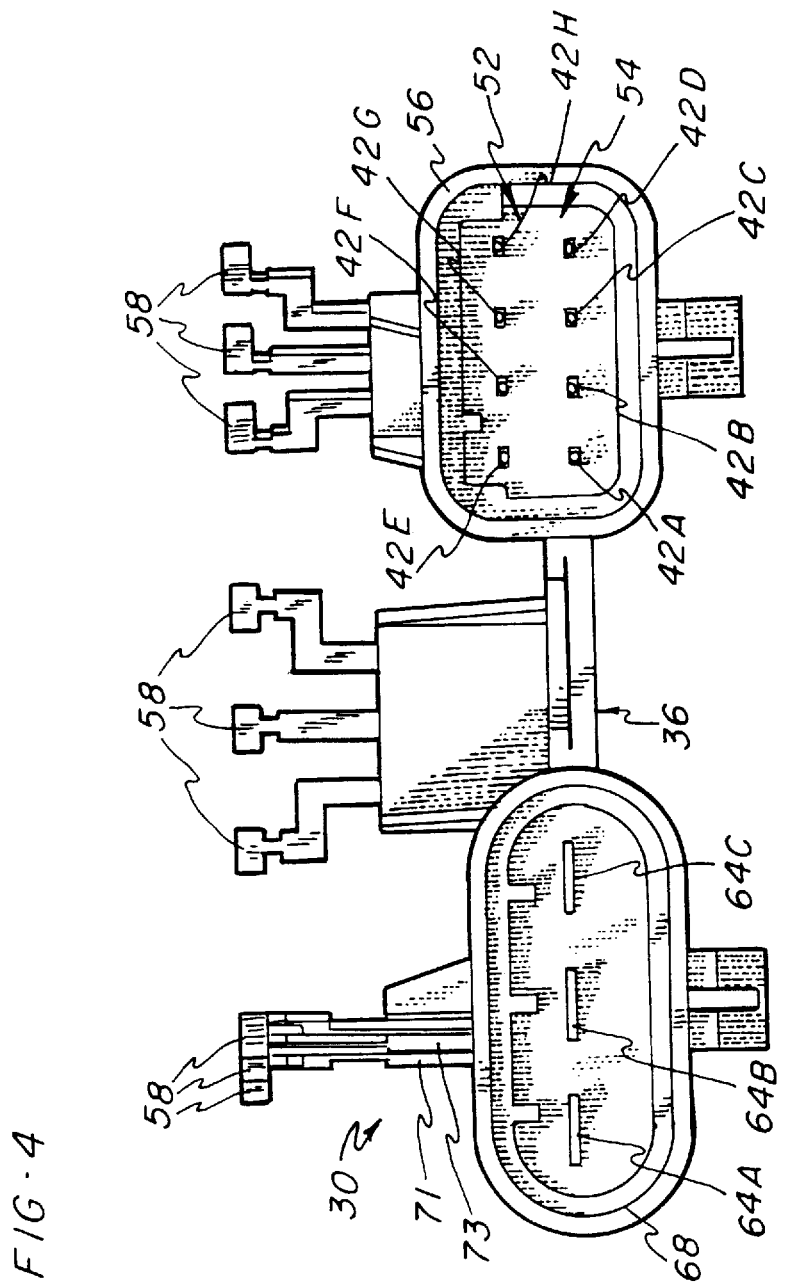

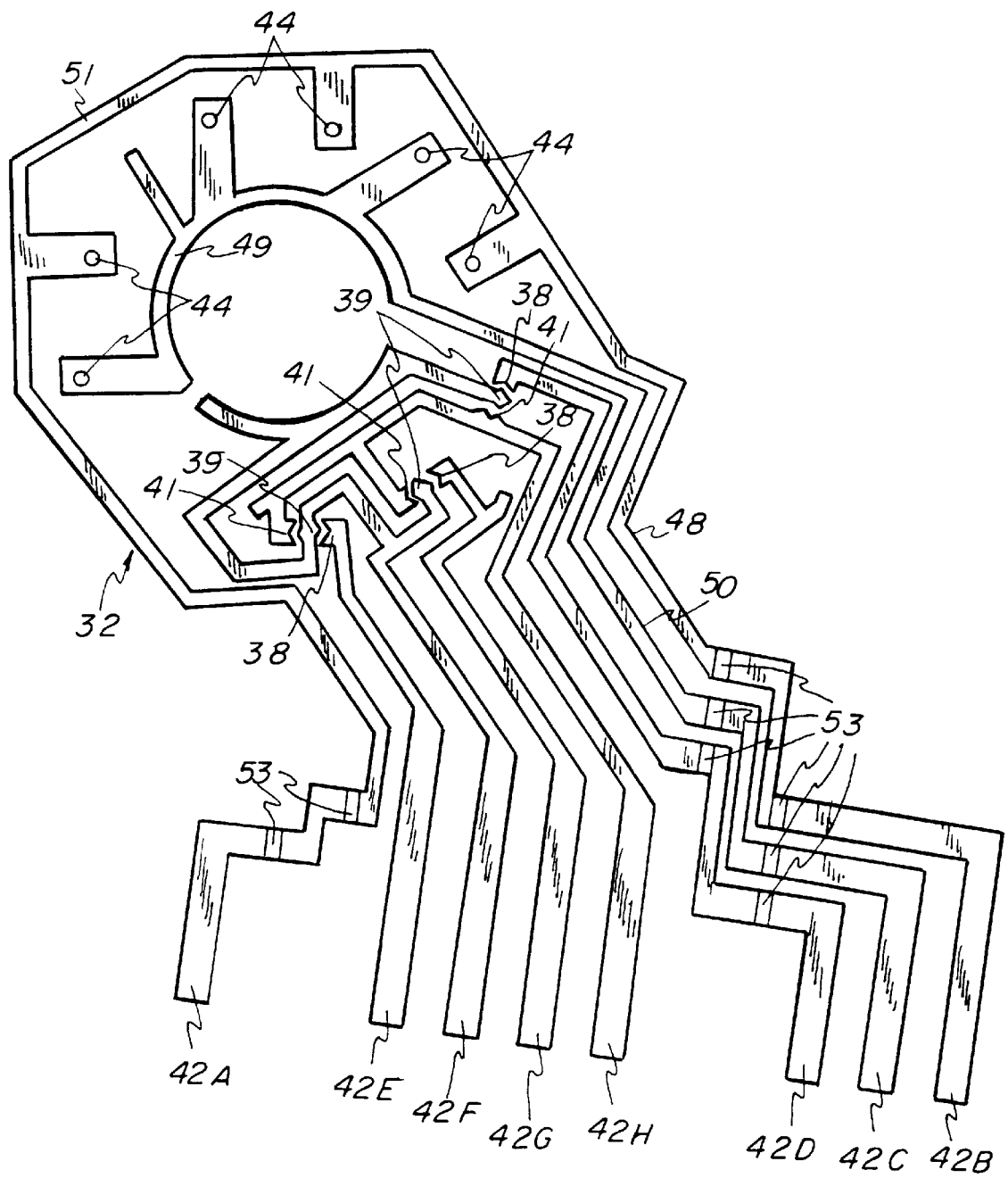

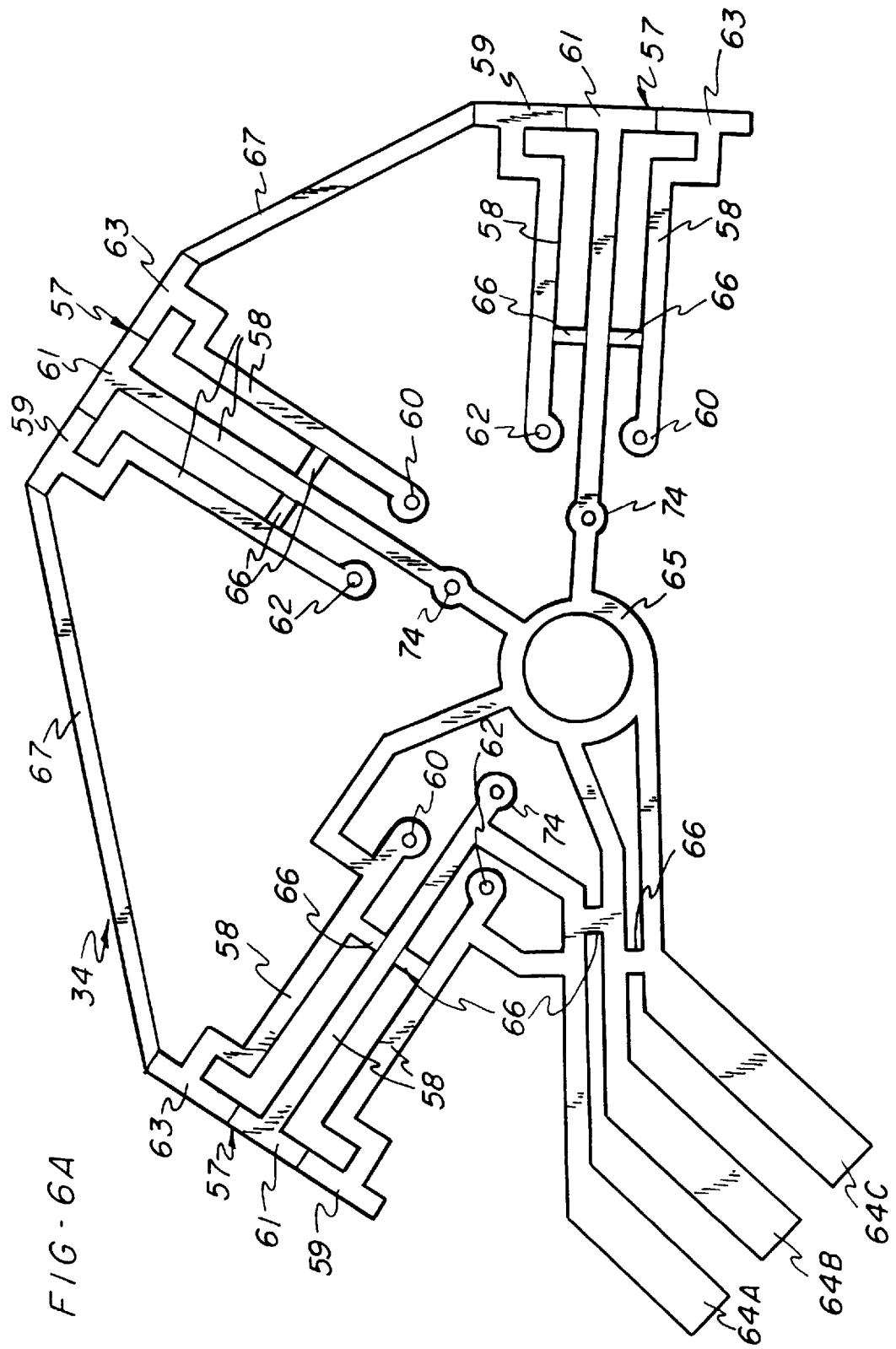

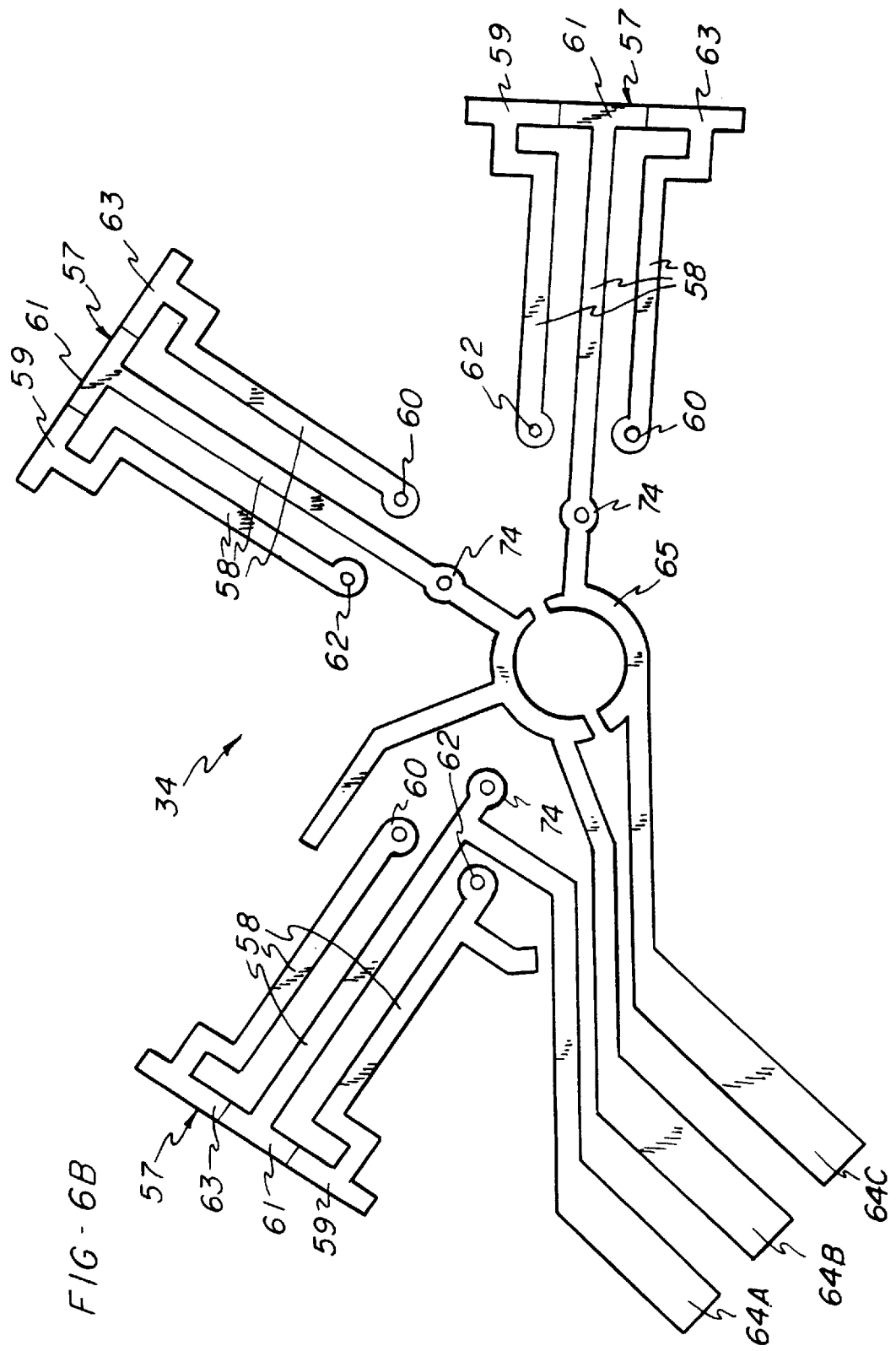

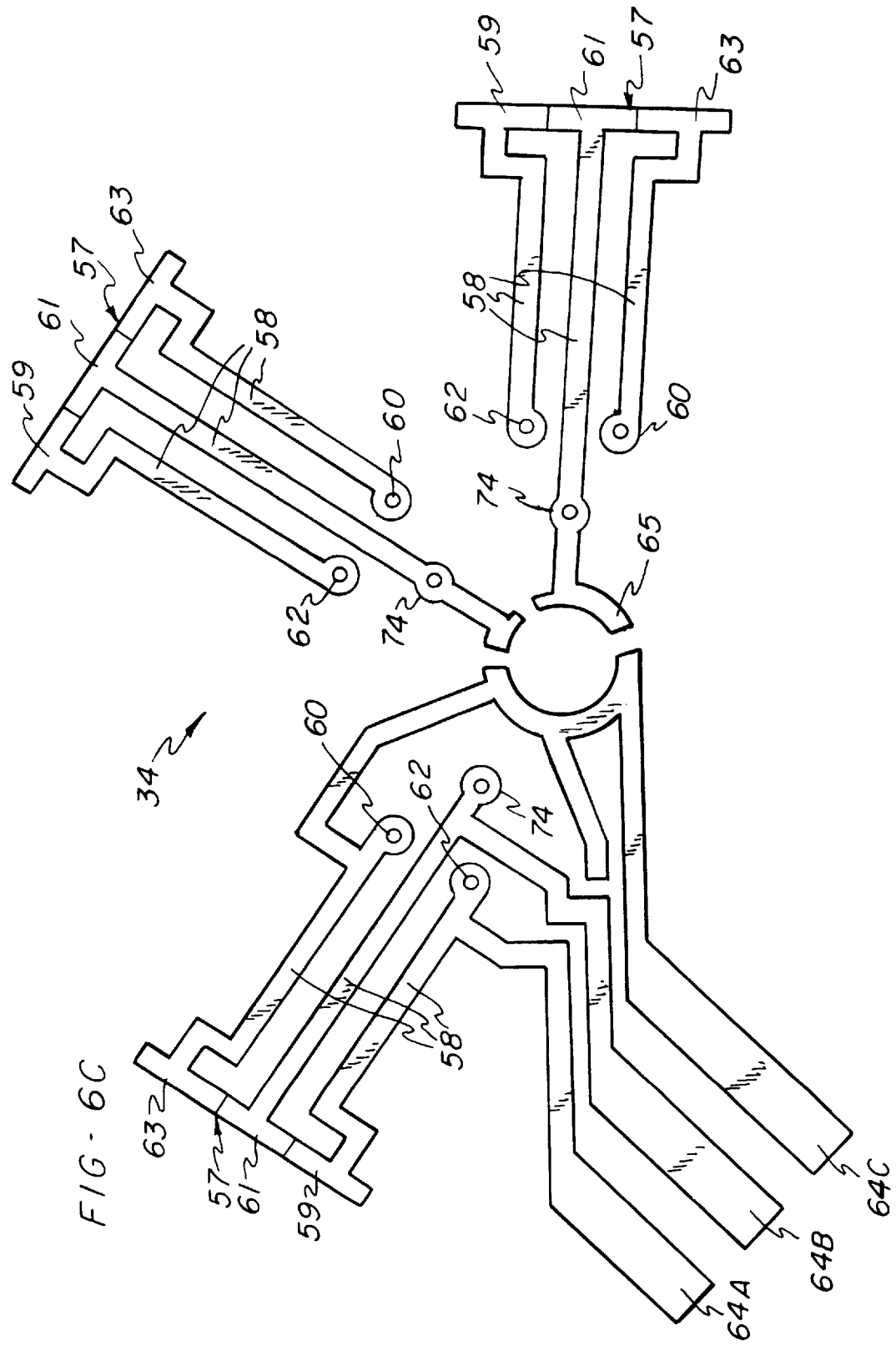

MOTOR TERMINATION BOARD

BACKGROUND OF THE INVENTION

1. Field of the Invention

The present invention relates to a brushless Direct Current motor and, more particularly, to a termination board for a brushless Direct Current motor which facilitates interconnection of electronic components therein.

2. Description of Related Art Brushless Direct Current (BLDC) motors are utilized in many environments and applications today due to their reliable performance and durability. One particular environment in which BLDC motors have not been used is in the electric power systems of vehicles, due in large part to cost constraints. However, in the interest of reducing exposure to liability, vehicle manufacturers are turning to BLDC motors for certain applications, such as the power steering of a vehicle. It has been found that an electrical short in the motor windings could cause the motor to act as a brake since it is difficult for the rotor to turn during such condition. This can lead to a situation where a steering wheel is locked up, thereby presenting a safety hazard.

In order to combat the potential shorting of the motor windings, relays or other switching devices may be installed in the circuit to open up the motor windings when a short is detected. The relays need to be installed as close as possible to the motor windings, however, to reduce the circuit resistance and maintain as high an efficiency for the motor as possible. Unfortunately, size constraints for the placement of BLDC motors in the vehicle environment mitigate against substantially enlarging the housing thereof to accommodate relays or other extra components.

Further, it will be understood that BLDC motors incorporate several different electronic components therein relating to the control and power requirements of the motor, which require connection with the motor windings and power supply, for example. An especially high number of interconnections are required when multiple parallel paths are utilized for the motor windings, which stems from low voltages being supplied thereto (e.g., a 12 volt battery). These interconnectins of leads not only increase circuit resistance, reduce reliability, and add cost to assembly of the motor, but also absorb space within the motor housing.

Accordingly, it would be desirable for a BLDC motor to be developed which reduces the number of interconnections between components thereof. It would also be desirable for such a BLDC motor to be developed which would be very space efficient so as to be able to include additional switching devices without significantly increasing its overall size for a given power rating.

SUMMARY OF THE INVENTION

In accordance with one aspect of the present invention, a motor termination board is disclosed for facilitating interconnection of control components and power components in a Brushless DC motor. The motor termination board includes a first stamping having a plurality of conductive paths, where the first stamping includes a plurality of connection points for receiving leads from control components and a plurality of control terminals for connecting the motor termination board to an electronic control of the motor. A second stamping is positioned adjacent the first conductive stamping and also has a plurality of conductive paths, where the second stamping includes a plurality of connection points for receiving leads from windings of the motor and a plurality of power terminals for connecting the motor termination board to a power supply for the motor. A termination board housing is provided for encapsulating the conductive paths of the first and second stampings and may include a first socket around the control terminals and a second socket around the power terminals. The motor termination board may further include a plurality of switching devices connected to the first and second stampings, wherein the switching devices operate to open up the motor windings upon detection of an electrical short therein.

In a second aspect of the present invention, a brushless DC motor is disclosed including a stator having a plurality of coil windings and a rotor containing a plurality of field magnets, where the rotor is rotatably mounted to a shaft therethrough. A plurality of sensors are provided for sensing the position of the rotor and sending the rotor position to an electronic control of the motor to provide for appropriate switching. A termination board is included for receiving leads from the motor windings and the sensors, with the termination board including a plurality of power terminals for connection with a power supply and a plurality of control terminals for connection with the electronic control of the motor. A motor housing is utilized for containing the stator, the rotor, and the termination board, with the control and power terminals extending outwardly of the housing. A plurality of switching devices may be mounted to the termination board adjacent the motor windings, wherein the switching devices open up the stator windings upon detection of an electrical short therein.

Accordingly, a primary objective of the present invention is to provide a termination board for a brushless DC motor which reduces the number of interconnections between the motor windings, the electronic control of the motor, the power leads, and the electronic components in the motor.

Another objective of the present invention is to provide a motor termination board for a brushless DC motor which reduces the amount of space required for connections between the motor windings, the electronic control, the power leads, and electronic components in the motor.

Still another objective of the present invention is to provide a motor termination board for a brushless DC motor which can handle current levels greater than the amount typically handled by existing printed circuit board technology.

Yet another objective of the present invention is to provide a termination board for a brushless DC motor which provides space within an existing motor housing for switching devices to open up the motor windings if an electrical short is detected.

Another objective of the present invention is to provide a termination board for a brushless DC motor which reduces the assembly cost of the motor.

A further objective of the present invention is to provide a termination board for a brushless DC motor which minimizes the overall size of the motor.

Still another objective of the present invention is to provide a termination board for a brushless DC motor which improves motor efficiency and reliability.

Another objective of the present invention is to provide a termination board for a brushless DC motor which permits installation of switching devices adjacent the motor windings to reduce circuit resistance and maintain high motor efficiency.

Yet another objective of the present invention is to provide a termination board for a brushless DC motor which promotes proper alignment of Hall effect sensors with the field magnets of the rotor.

Another objective of the present invention is to provide a brushless DC motor for use with the electric power steering system of a vehicle.

A further objective of the present invention is to provide a brushless DC motor for use with the power steering of a vehicle in which an electrical short in the motor windings is prevented from acting as a brake and locking up the steering wheel.

These objectives and other features of the present invention will become more readily apparent upon reference to the following description when taken in conjunction with the following drawings.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

FIG. 3 is a perspective view of the motor termination board depicted in FIGS. 1 and 2;

FIG. 4 is a side view of the motor termination board depicted in FIG. 3;

FIG. 5B is an enlarged top view of the first stamping shown in FIG. 5A, where certain bridges have been pierced and certain conductive paths have been disconnected during formation of the termination board to give the motor a delta configuration;

FIG. 6A is an enlarged top view of a second stamping contained in the motor termination board, where bridges between conductive paths existing prior to formation of the termination board are depicted;

FIG. 6B is an enlarged top view of the second stamping shown in FIG. 6A, where certain bridges have been pierced and certain conductive paths have been disconnected during formation of the termination board to give the motor a delta configuration; and FIG. 6C is an enlarged top view of the second stamping shown in FIG. 6A, where certain bridges have been pierced and certain conductive paths have been disconnected during formation of the termination board to give the motor a wye configuration.

DETAILED DESCRIPTION OF THE INVENTION

Figure 1:
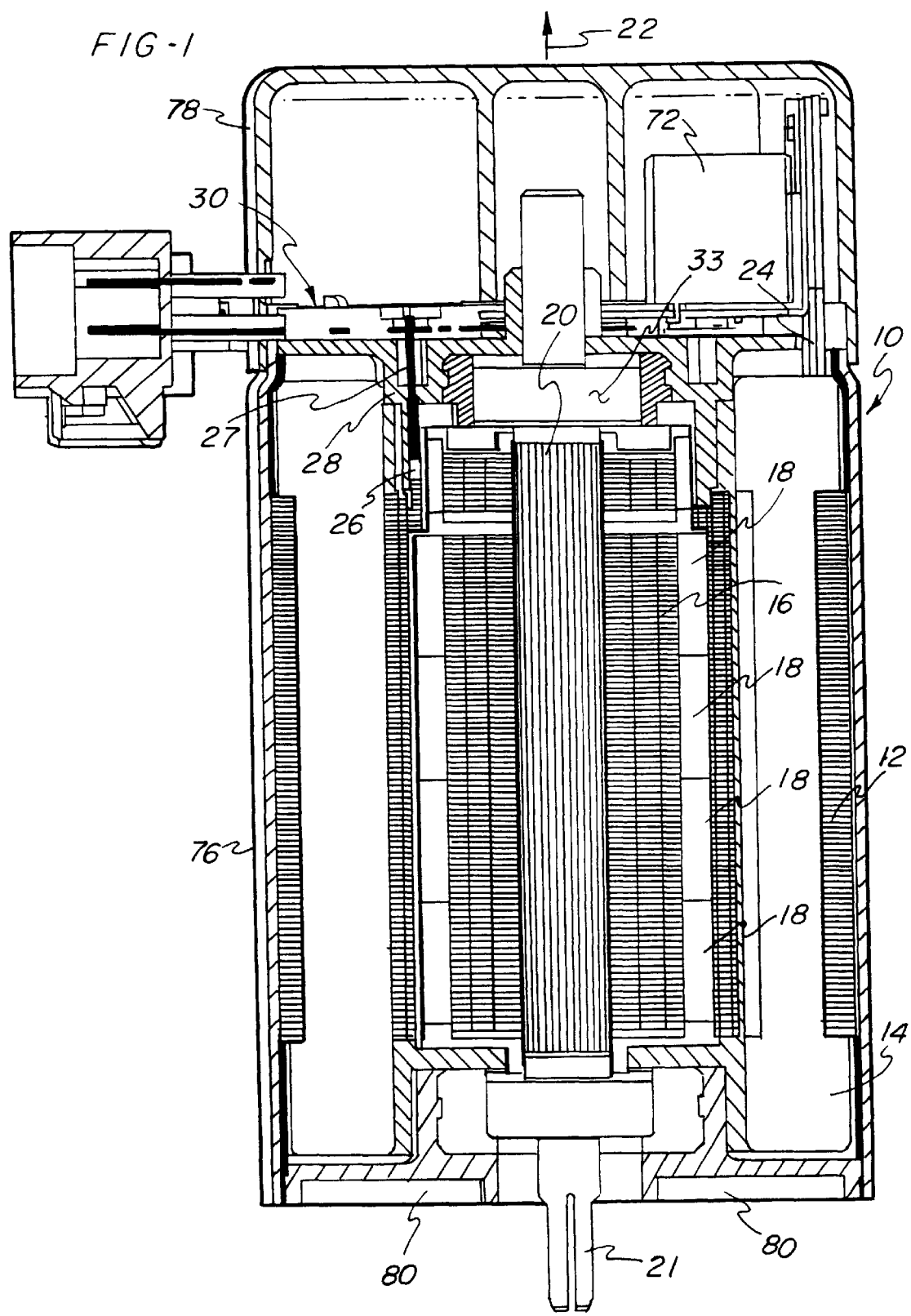
FIG. 1 is a cross-sectional view of a brushless DC motor containing a termination board of the present invention.

Referring now to the drawing in detail wherein identical numerals indicate the same elements throughout the figures, FIG. 1 depicts a brushless DC electric motor designated by the numeral 10. Motor 10 generally has a standard design which includes a stator 12 having coil windings 14 wrapped therein and a rotor 16 positioned concentrically inside stator 12 containing a plurality of field magnets 18. It will be understood that rotor 16 is mounted to a rotatable shaft 20 which extends through a center line axis 22 of motor 10. In this way, magnetic fields are induced between the rotor and stator as rotor 16 rotates. These magnetic fields (due to voltage excitation of coil windings 14) are then transformed into rotation and torque to shaft 20 so that work may be performed by an output end 21 thereof. In an electrical power steering system for a vehicle, for example, shaft output end 21 is utilized to drive a gear reduction attached to a steering column.

Figure 2:
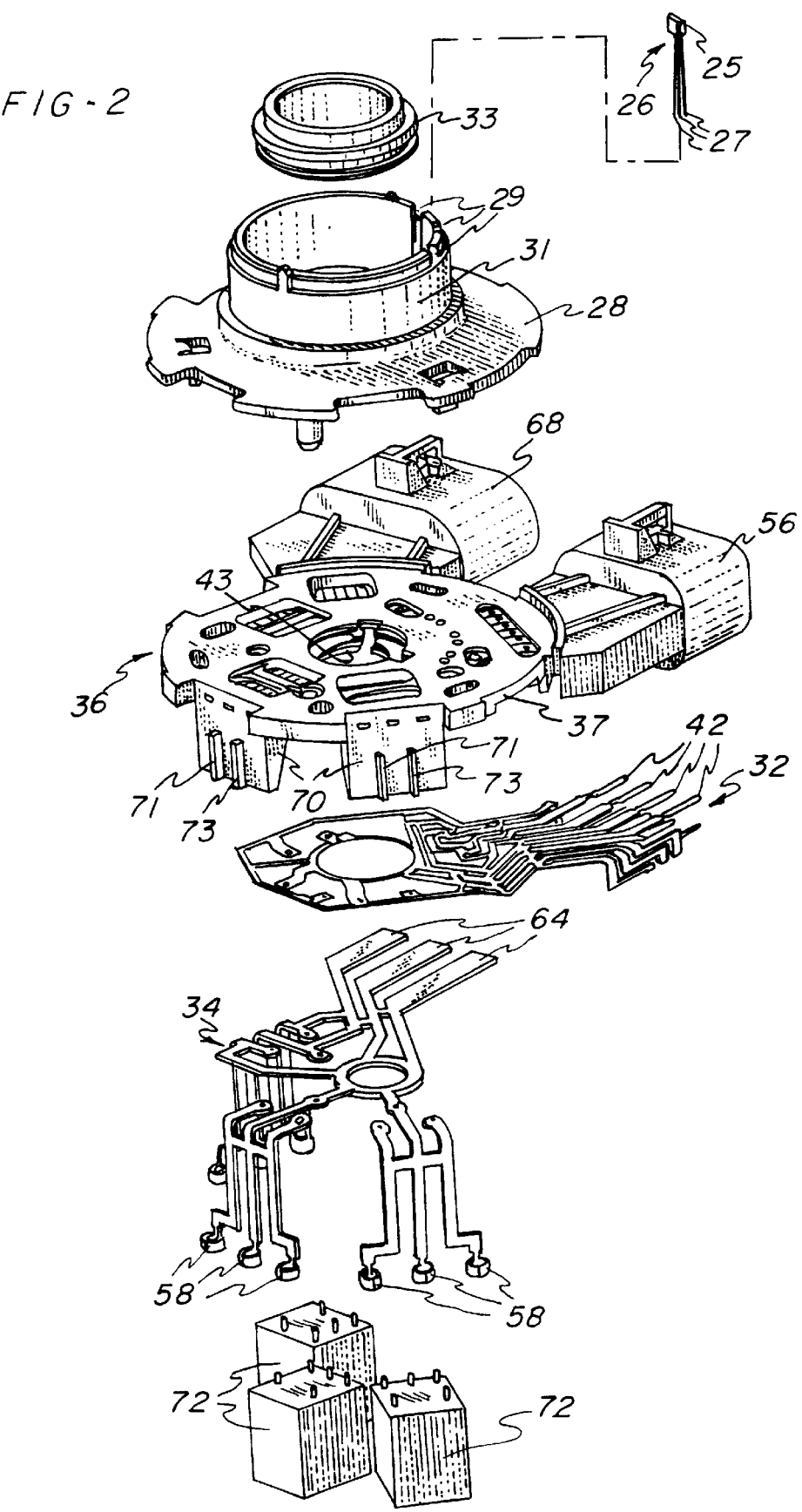
FIG. 2 is an exploded perspective view of the termination board depicted in FIG. 1.

As is well known in the art, a plurality of sensors 26, such as Hall effect sensors, are utilized to continuously sense the position of rotor 16 and send this rotor position information to an electronic control (not shown) connected to motor 10 to provide for appropriate switching therein. As seen in FIGS. 1 and 2, an annular holder 28 having a plurality of notches 29 properly positioned in an annular wall 31 thereof is preferably utilized to contain a body 25 of sensors 26 therein. Leads 27 of Hall effect sensors 26 are permitted to extend through holder 28 so they may be connected to first stamping 32, as described later herein. It is important that the Hall effect sensors 26 be properly positioned within motor 10 so that they align with the poles of field magnets 18, whereby they can provide accurate positioning information for rotor 16. Holder 28 will also be seen in FIG. 2 to contain a bearing insert 33 therein through which shaft 20 extends. It will be understood that a bearing (not shown) is mounted on shaft 20 so that the bearing's outer diameter engages bearing insert 33.

In accordance with the present invention, a termination board, identified generally by the numeral 30, is utilized to facilitate the interconnection of winding leads 24, sensors 26, an electronic control for motor 10, and a power source for motor 10. Termination board 30 may also be utilized to connect switching devices within the motor circuit to prevent an electrical short within coil windings 14 from acting as a brake to the turning of rotor 16, as will be discussed in more detail hereinafter. More specifically, as best seen in FIG. 2, termination board 30 includes a first stamping 32 having a plurality of conductive paths, a second stamping 34 having a plurality of conductive paths, and a termination board housing 36 for encapsulating the conductive paths of first and second stampings 32 and 34.

Figure 5A:
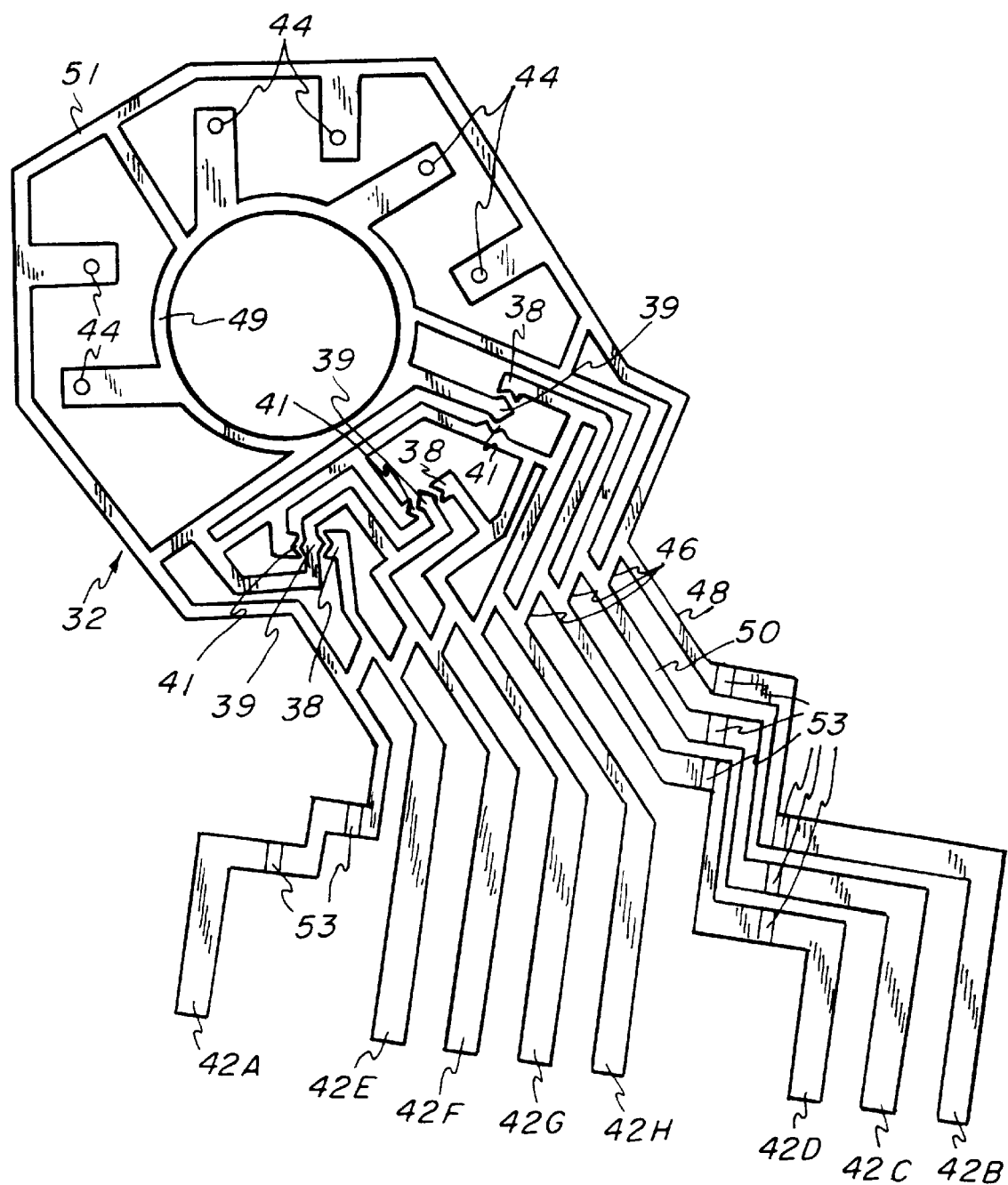
FIG. 5A is an enlarged top view of a first stamping contained in the motor termination board, where bridges between conductive paths existing prior to formation of the termination board are depicted.
Figure 5C:
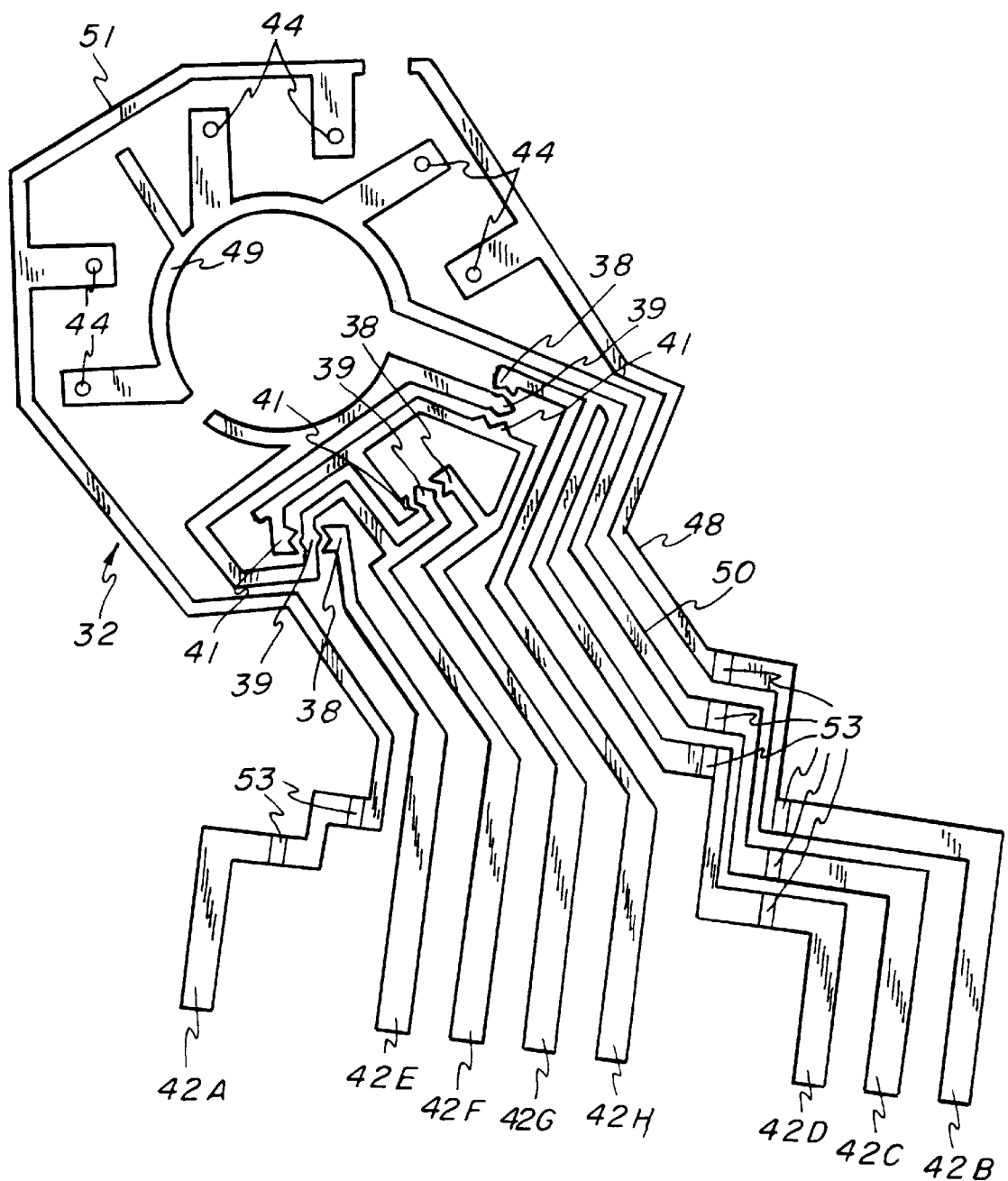
FIG. 5C is an enlarged top view of the first stamping shown in FIG. 5A, where certain bridges have been pierced and certain conductive paths have been disconnected during formation of the termination board to give the motor a wye configuration.

It will be seen in FIGS. 5A-C that first stamping 32, which preferably is made of half hard, pre-tin plated brass, has a plurality of connection points 38, 39 and 41 for receiving leads 27 from each sensor 26, as well as a plurality of control terminals 42 for connecting termination board 30 to an electronic control of motor 10. Control terminals 42 preferably will take the form of connector pins, which are formed by curling terminals 42. Connector pins 42 will then be positioned in two parallel rows 52 and 54 of four each, as best seen in FIGS. 2–4. This occurs by having specified bend points 53 in certain terminals 42A, 42B, 42C, and 42D to position them in a plane below first stamping 32 (see FIG. 5A). It will be noted that terminals 42E, 42F, 42G, and 42H of row 54 lie within the same plane as first stamping 32 and are substantially parallel to terminals 42A–D. Alternatively, terminals 42A–H may be designed to connect wire leads which can be extended to the electronic control or an intermediate connection device.

First stamping 32 also includes a plurality of connection points 44 for connection to switching devices, as discussed later herein. A plurality of bridges 46 are shown in FIG. 5A as connecting adjacent conductive paths (e.g., conductive paths 48 and 50), whereby first stamping 32 may be maintained as a single piece for ease of handling. It will be understood that certain ones of bridges 46 will be removed during the process of manufacturing termination board 30, as seen in FIGS. 5B and 5C, as well as breaks in certain conductive paths (including a central annular conductive path 49 and an outer annular conductive path 51) depending on whether motor 10 is to have a delta or wye configuration respectively. In this way, dielectric isolation between the appropriate conductive paths of first stamping 32 is facilitated.

Second stamping 34, which preferably is made of a half hard, pre-tin plated copper, is best shown in FIGS. 6A–C, where a plurality of connection points or terminals 58 are provided for receiving leads 24 of coil windings 14. It will be seen that each terminal 58 is formed by cutting a common end portion 57 (see FIG. 6A) to leave three T-shaped members 59, 61 and 63, with the separate ends thereof then being curled (as best seen in FIG. 2). Terminals 58 are preferably bent substantially 90° from the plane in which second stamping 34 lies in order to better position winding leads 24 and provide efficient spacing within motor 10. A plurality of power terminals 64A, 64B and 64C are included on second stamping 34 for connection to a power supply (not shown), preferably one which provides three phase power. Terminals 64A–C preferably are in the form of flat pins which lie in the same plane as second stamping 34, as seen in FIGS. 2–4, but may be designed to connect wire leads which can be extended to the power supply or an intermediate connection device.

Second stamping 34 also includes connection points 60, 62 and 74 for connecting second stamping 34 with a switching device as described later herein. It will also be noted that bridges 66 and 67 shown in FIG. 6A connect adjacent conductive paths and adjacent sets of terminals 58, respectively, and are utilized to enable second stamping 34 to be handled as a single piece during the manufacturing process. As indicated with respect to first stamping 32, certain ones of bridges 66 will be removed during the process of manufacturing termination board 30, as seen in FIGS. 6B and 6C, along with breaks in certain conductive paths (including an inner annular conductive path 65). Additionally, larger bridges 67 positioned between adjacent sets of terminals 58 are removed.

It will be understood that first and second stampings 32 and 34 have been configured with their respective conductive paths, connection points, and terminals so as to minimize the number of stampings required. This not only allows termination board 30 to be smaller in size and thus reduce the amount of space required in motor 10, but also saves cost in X terms of material needed and assembly time. However, if desired, more than two stampings may be utilized in conjunction with termination board 30 and still be within the scope of the present invention. For example, two separate stampings could be substituted for first stamping 32, whereby each row of control connector pins 42 could be associated with a separate stamping in order to eliminate the need for bend points 53 in terminals 42A–D.

Termination board housing 36, which is preferably made of a high dielectric material (e.g., polyester (PET) (TP)), has a substantially planar main section 37 with a central opening 43 for shaft 20 to extend through and an outer perimeter configured to be properly positioned within motor 10. Additionally, termination board housing 36 preferably includes a first socket 56 positioned around control connector pins 42 for reception of a connection plug which connects motor 10 with the electronic control therefor, as well as a second socket 68 formed around power connector pins 64 so that a suitable plug may be received for connection with a power supply. Termination board housing 36 also may include a plurality of walls 70 adjacent terminals 58 which extend substantially 90° from a plane through termination board housing 36. Walls 70, which may assist in positioning switching devices 72, each include a pair of ribs 71 and 73 which extend between adjacent terminals 58 to prevent shorting of the winding leads 24 connected thereto.

While the use of relays for switching devices 72 is preferred, other switching devices, such as transistors, may be utilized to perform the function of opening up motor windings 14 if an electrical short is detected therein. Nevertheless, it will be understood that connection points 44 of first stamping 32 are connected by soldering or the like to the coil terminals of relays 72 and connection points 60, 62, and 74 of second stamping 34 connect motor winding leads 24 to the contact terminals of relays 72. Additionally, a power connection is made to relays 72 by means of a connecting point 74 on second stamping 34, depending on whether motor 10 is connected in a delta or wye configuration. In this way, termination board 30 is able to provide all necessary interconnections between power connector pins or terminals 64, relays 72, Hall effect sensors 26, and control connector pins or terminals 42 in an integral package which minimizes space requirements within motor 10. In fact, this device for minimizing space enables relays 72 to be positioned within motor 10 without significantly increasing the overall size thereof.

It will be seen best in FIG. 1 that motor 10 includes a motor housing 76, which is located around stator 12 and holds stator 12, termination board 30, and holder 28 together with a flange 80. A termination cover 78 is attached to motor housing 76 and is positioned on the opposite side of termination board 30. It will be understood that power connector pins 64 and control connector pins 42, as well as sockets 68 and 56 surrounding such respective pins, will extend outwardly of housing 76 and termination cover 78.

With respect to the manufacture of termination board 30, first and second stampings 32 and 34 (as seen in FIGS. 5A and 6A) are positioned in a mold where they are held by pairs of opposing pins at the holes in connection points 44 and connection points 60, 62 and 74, respectively. Pairs of opposing pins are also located at locations where bridges 46 and 66 are pierced to detach individual conductive paths in first and second stampings 32 and 34. Thereafter, the high dielectric material used for termination board housing 36 is injected into the mold to encapsulate the conductive paths of first and second stamping 32 and 34, as well as form sockets 56 and 68 around control connector pins 42 and power connector pins 64. Preferably, walls 70 with ribs 71 and 73 are also formed to maintain the positioning of winding terminals 58. Once the termination board housing 36 has cured, termination board 30 is removed from the mold, bridges 67 are removed from second stamping 34, and terminals 58 are bent into position. The construction of termination board 30 and the respective materials utilized for first stamping 32, second stamping 34, and termination board housing 36 enable it to handle currents in excess of 25 Amperes, which is much greater than that handled by current printed circuit board technology.

Having shown and described the preferred embodiment of the present invention, further adaptations of the termination board for a brushless DC motor can be accomplished by appropriate modifications by one of ordinary skill in the art without departing from the scope of the invention. In particular, annular wall 31 of holder 28 may be incorporated into the bottom surface of termination board housing 36, for example.

What is claimed is:

1. A motor termination board for facilitating interconnection of control components and power components in a brushless DC motor, the motor including windings, and the windings and control components including leads, the motor termination board comprising:

(a) a first stamping having a plurality of conductive paths, said first stamping including a plurality of connection points for receiving the leads from said control components and a plurality of control terminals for connecting said motor termination board to an electronic control of said motor;

(b) a second stamping having a plurality of conductive paths, said second stamping including a plurality of connection points for receiving the leads from the windings of said motor and a plurality of power terminals for connecting said motor termination board to a power supply for said motor;

(c) a termination board housing for encapsulating the conductive paths of said first and second stampings;

wherein said first and second stampings lie in substantially parallel, spaced planes and said termination board housing separates said first and second stampings; and further comprising a plurality of switching device mounted to said termination board and connected to said first and second stamping, wherein said switching devices operates to open up said motor winding upon detection of an electrical short therein.

2. The motor termination board of claim 1, said termination board housing further comprising a first socket surrounding said control terminals.

3. The motor termination board of claim 2, said termination board housing further comprising a second socket surrounding said power terminals.

4. The motor termination board of claim 1, wherein said first stamping is made of brass.

5. The motor termination board of claim 1, wherein said second stamping is made of copper.

6. The motor termination board of claim 1, wherein said termination board housing is made of a high dielectric material.

7. The motor termination board of claim 1, wherein power is distributed to said conductive paths of said first and second stampings in a wye configuration.

8. The motor termination board of claim 1, wherein power is distributed to said conductive paths of said first and second stampings in a delta configuration.

9. The motor termination board of claim 1, said control components including Hall effect sensors for sensing position of a rotor in said motor, wherein said connection points for said Hall effect sensors are positioned to align said Hall effect sensors with poles of field magnets in said motor rotor.

10. The motor termination board of claim 1, said control components including a plurality of Hall effect sensors for sensing position of a rotor in said motor, wherein said termination board housing further comprises a flange extending substantially perpendicular to said first and second stampings having compartments for retaining said Hall effect sensors in a position aligned with field magnets of said rotor.

11. The motor termination board of claim 1, wherein a predetermined number of said control terminals lie in a plane defined by said first stamping, and other ones of said control terminals lie in a plane different from said plane defined by first stamping.

12. The motor termination board of claim 1, wherein said connection points of said second stamping for said motor windings are positioned substantially perpendicular to a plane through said second stamping.

13. The motor termination board of claim 1, wherein said motor termination board is able to receive current in excess of 25 Amperes.

14. The motor termination board of claim 1, wherein said switching devices are relays having contacts and coils.

15. The motor termination board of claim 14, wherein said relay coils are connected to connection points of said first stamping.

16. The motor termination board of claim 14, wherein said relay contacts are connected to connection points of said second stamping.

17. The motor termination board of claim 14, said relays being positioned adjacent said winding leads to minimize circuit resistance.

18. The motor termination board of claim 14, wherein said relays are positioned on a surface of said motor termination board and said connection points of said second stamping for said motor windings are positioned substantially perpendicular to a plane through said second stamping adjacent said relays.

19. A brushless DC motor, comprising:

(a) a stator containing a plurality of stator windings including leads;

(b) a rotor containing a plurality of field magnets, said rotor being mounted to a rotatable shaft;

(c) a plurality of sensors for sensing position of said rotor and sending said rotor position to an electronic control of said motor to provide for appropriate switching, said sensors including leads;

(d) a termination board for receiving the leads from said stator windings and said sensors, said termination board including a plurality of power terminals for connection with a power supply and a plurality of control terminals for connection with said electronic control;

(e) a motor housing for containing said stator, said rotor, and said termination board, wherein said control and power terminals extend outside said housing;

said termination board further comprising:

(i) a f first stamping having a plurality of conductive paths, said first stamping including a plurality of connection points for receiving leads from said sensors and including said control terminals;

(ii) a second stamping having a plurality of conductive paths, said second stamping including a plurality of connection points for receiving leads from said stator windings and including said power terminals; and (iii) a termination board housing for encapsulating the conductive paths of said first and second stampings wherein said first and second stampings are positioned in substantially parallel, spaced planes; and further comprising a plurality of switching devices mounted to said termination boards and connected to said first and second stampings, wherein said switches devices operate to open up said motor winding upon detection of an electrical short therein.

20. A brushless DC motor, comprising:
(a) a stator containing a plurality of stator windings including leads;
(b) a rotor containing a plurality of field magnets, said rotor being mounted to a rotatable shaft;
(c) a plurality of sensors for sensing position of said rotor and sending said rotor position to an electronic control of said motor to provide for appropriate switching, said sensors including leads;
(d) a termination board for receiving the leads from said stator windings and said sensors, said termination board including a plurality of power terminals for connection with a power supply and a plurality of control terminals for connection with said electronic control;
(e) a motor housing for containing said stator, said rotor, and said termination board, wherein said control and power terminals extend outside said housing; and
further comprising a plurality of switching devices mounted to said termination board, wherein said switching devices open up said stator windings upon detection of an electrical short therein.

21. The brushless DC motor of claim 19, said termination board housing further comprising a first socket around said control terminals and a second socket around said power terminals.

* * * * *

UNITED STATES PATENT AND TRADEMARK OFFICE
CERTIFICATE OF CORRECTION

PATENT NO. : 5,770,902
DATED : June 23, 1998
INVENTOR(S) : L. Jay Batten and Dennis L. Queary It is certified that error appears in the above-indentified patent and that said Letters Patent is hereby corrected as shown below:

Col. 8 Claim 19, line 53, should read "(i) a first . . . ",
not "(i) a f first . . . "

Claim 19, line 66, should read "termination board",
not "termination boards"

Claim 19, line 67, should read "switching", not "switches"

Col. 9 Claim 19, line 1, should read ""windings", not "winding"

Signed and Sealed this

Twenty-fifth Day of August, 1998

Attest:

BRUCE LEHMAN

Attesting Officer

Commissioner of Patents and Trademarks